(12) United States Patent
Kim et al.

(10) Patent No.: US 10,470,004 B2
(45) Date of Patent: Nov. 5, 2019

(54) PUSH-TO-TALK SERVICE PLAYING DATA

(71) Applicant: Samsung Electronics Co., Ltd., Suwon-si, Gyeonggi-do (KR)

(72) Inventors: Yong-Tae Kim, Suwon-si (KR); Jae-Han Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/767,987

(22) PCT Filed: Oct. 5, 2016

(86) PCT No.: PCT/KR2016/011134
§ 371 (c)(1),
(2) Date: Apr. 12, 2018

(87) PCT Pub. No.: WO2017/065449
PCT Pub. Date: Apr. 20, 2017

(65) Prior Publication Data
US 2018/0302758 A1 Oct. 18, 2018

(30) Foreign Application Priority Data

Oct. 12, 2015 (KR) .......................... 10-2015-0141984

(51) Int. Cl.
*H04W 4/10* (2009.01)
*H04W 4/70* (2018.01)
(Continued)

(52) U.S. Cl.
CPC ........... *H04W 4/10* (2013.01); *H04L 65/4061* (2013.01); *H04L 65/4069* (2013.01); *H04L 67/125* (2013.01); *H04W 4/70* (2018.02)

(58) Field of Classification Search
CPC ......... H04W 4/10; H04W 76/45; H04W 4/18; H04W 4/70; H04L 65/4061; H04L 67/125
(Continued)

(56) References Cited

U.S. PATENT DOCUMENTS 5,765,164 A * 6/1998 Prasad ............... H04N 21/4143
8,842,663 B2 9/2014 Brothers et al.
(Continued)

FOREIGN PATENT DOCUMENTS

KR  10-2006-0084720 A  7/2006

OTHER PUBLICATIONS

ISA/KR, "International Search Report and Written Opinion of the International Searching Authority," International Application No. PCT/KR2016/011134, dated Jan. 6, 2017, 9 pages.

*Primary Examiner* — Philip Sobutka

(57) ABSTRACT

The present disclosure relates to a technology for a sensor network, machine to machine (M2M) communication, machine type communication (MTC), and Internet of things (IoT). The present disclosure may be utilized for an intelligent service (smart home, smart building, smart city, smart car or connected car, health care, digital education, retail business, security and a safety-related service, etc.) on the basis of the technology. A method for providing a push-to-talk (PTT) service in a communication system, which is proposed by an embodiment of the present disclosure, comprises the steps of: generating a file format including information associated with time points at which multiple pieces of data should be reproduced; and reproducing the multiple pieces of data on the basis of the file format.

11 Claims, 6 Drawing Sheets

(51) Int. Cl.
*H04L 29/06* (2006.01)
*H04L 29/08* (2006.01)

(58) Field of Classification Search
USPC .................................. 455/518–520, 414.1
See application file for complete search history.

(56) References Cited

U.S. PATENT DOCUMENTS

| | | |
|---|---|---|
| 2007/0049314 A1 | 3/2007 | Balachandran et al. |
| 2008/0268792 A1 | 10/2008 | Munje |
| 2010/0190478 A1 | 7/2010 | Brewer et al. |
| 2013/0303226 A1* | 11/2013 | Katis .................. H04W 4/10 455/518 |

* cited by examiner

PUSH-TO-TALK SERVICE PLAYING DATA

CROSS-REFERENCE TO RELATED APPLICATIONS

This application is a National Phase Entry of PCT International Application No. PCT/KR2016/011134, which was filed on Oct. 5, 2016, and claims priority to Korean Patent Application No. 10-2015-0141984, which was filed on Oct. 12, 2015, the contents of which are incorporated herein by reference.

BACKGROUND

1. Field

The present disclosure relates to a communication system, and specifically to, a method and device for providing a push-to-talk (PTT) service in a communication system.

2. Description of the Related Art

The Internet is evolving from the human-centered connection network by which humans create and consume information to the Internet of Things (IoT) network by which information is communicated and processed between things or other distributed components. The Internet of Everything (IoE) technology may be an example of a combination of the Big data processing technology and the IoT technology through, e.g., a connection with a cloud server.

To implement the IoT, technology elements, such as a sensing technology, wired/wireless communication and network infra, service interface technology, and a security technology, are required. There is a recent ongoing research for inter-object connection technologies, such as the sensor network, Machine-to-Machine (M2M), or the Machine-Type Communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing IT technologies and various industries.

In a communication system for a user equipment (UE), the overall service area is typically split into multiple base station areas to configure cells, which are small service areas, and base stations are intensively controlled by a mobile switching center (MSC) to allow subscribers to conduct phone calls while moving from one cell to another.

For such UE, various techniques are being developed to combine internet protocol (IP) networks, which use internet-based protocols, with wireless communication networks as communication technology grows. Packet-based voice over IP (VoIP) service using IP is among such techniques.

Packet-based call services as per the prior art, which are operated as set forth above, require that calls be established via the IP communication network and IP network, suffering from the shortcoming that it takes relatively long to establish a call. To address such shortcoming, the multicast function of the IP network may be used to provide interactive call services, such as of group call and private call. Here, interactive call service is a sort of call that is made by users' interaction, e.g., a PTT function of, e.g., walkie-talkie.

Further, group call means a multi-party call among users in a predetermined user group, and private call means a one-to-one call among users in a predetermined user group. Such PTT service is a service enabling data service targeting multiple users or groups, and this service enables playing data in real-time or the replay of data that has been played in real-time for multiple users or a group on UEs. Here, the data service means a service providing at least one of voice, video, and text.

However, where a conventional UE replays data, which has been played in real-time, targeting multiple users or a group via the PTT service, the UE replays data that a corresponding UE has sent as per the turn of the corresponding UE in the PTT service without accounting for association between data that UEs have sent. As an example, a conventional UE may replay data that has been played in real-time targeting multiple users or a group through the PTT service as shown in FIG. 1.

FIG. 1 shows an example of providing a PTT service on a conventional UE.

It is assumed in the embodiment of FIG. 1 that in the PTT service a first UE 110 enters a push button for first transmitting data to send first inquiry data 111 and that, while the push button keeps on being entered for transmission of second inquiry data 113, a second UE 130 enters a push button for transmitting data responsive to the first inquiry data 111 to send first response data 131. It is also assumed that the first UE 110 resends the second inquiry data 113 while keeping on entering the push button, and that a third UE 130 enters a push button for transmitting data responsive to the second inquiry data 113 to send second response data 151. At this time, the first UE 110 stores the transmitted data for each of the first UE 110, the second UE 130, and the third UE 150.

Thereafter, upon entry of an event in which the first UE 110 replays the data previously played through the PTT service, the first UE 110, since it stores the transmitted data for each of the first UE 110, the second UE 130, and the third UE 150, plays all the data 111 and 113 that the first UE 110 has sent, the data 131 that the second UE 130 has sent, and then the data 150 that the third UE 150 has sent, as per the order of data transmission through the PTT service. That is, since the first UE 110 plays the data in the order of the first inquiry data 111, the second inquiry data 113, the first response data 131, and the second response data 151 in the PTT service, it cannot precisely provide the user with the data which has been provided in real-time in the PTT service.

Accordingly, there is a need for a scheme for the first UE 110 to precisely provide the same data as data previously played for multiple users or a group through the PTT service.

SUMMARY

According to an embodiment of the present disclosure, there are provided a method and device for providing a PTT service in a communication service.

According to an embodiment of the present disclosure, there are provided a method and device for providing a PTT service based on information related to the time when data was transmitted in a communication system.

According to an embodiment of the present disclosure, there are provided a method and device for providing a PTT service based on information related to the time when data is to be played in a communication system.

As proposed according to an embodiment of the present disclosure, a method for providing a push to talk (PTT)

service in a communication system comprises the steps of generating a file format containing information related to a time when each of a plurality of data should be played and playing the plurality of data based on the file format.

As proposed according to an embodiment of the present disclosure, a device for providing a push to talk (PTT) service in a communication system comprises a controller performing control to generate a file format containing information related to a time when each of a plurality of data should be played and to play the plurality of data based on the file format.

Other aspects, advantages, and core features of the present disclosure will be apparent to one of ordinary skill in the art from the following detailed description taken in conjunction with the accompanying drawings and disclosing preferred embodiments of the present disclosure.

Prior to going into the detailed description of the disclosure, it might be effective to define particular words and phrases as used herein. As used herein, the terms "include" and "comprise" and their derivatives may mean doing so without any limitations. As used herein, the term "or" may mean "and/or." As used herein, the phrase "associated with" and "associated therewith" and their derivatives may mean "include," "be included within," "interconnect with," "contain," "be contained within," "connect to or with," "couple to or with," "be communicable with," "cooperate with," "interleave," "juxtapose," "be proximate to, "be bound to or with, "have, or "have a property of," As used herein, the term "controller" may mean any device, system, or part thereof controlling at least one operation. As used herein, the term "device" may be implemented in hardware, firmware, software, or some combinations of at least two thereof. It should be noted that functions, whatever particular controller is associated therewith, may be concentrated or distributed or implemented locally or remotely. It should be appreciated by one of ordinary skill in the art that the definitions of particular terms or phrases as used herein may be adopted for existing or future in many cases or even though not in most cases.

BRIEF DESCRIPTION OF THE DRAWINGS

It should be noted that the same or similar reference denotations may be used to refer to the same or similar elements, features, or structures throughout the drawings.

DETAILED DESCRIPTION

Figure 1:
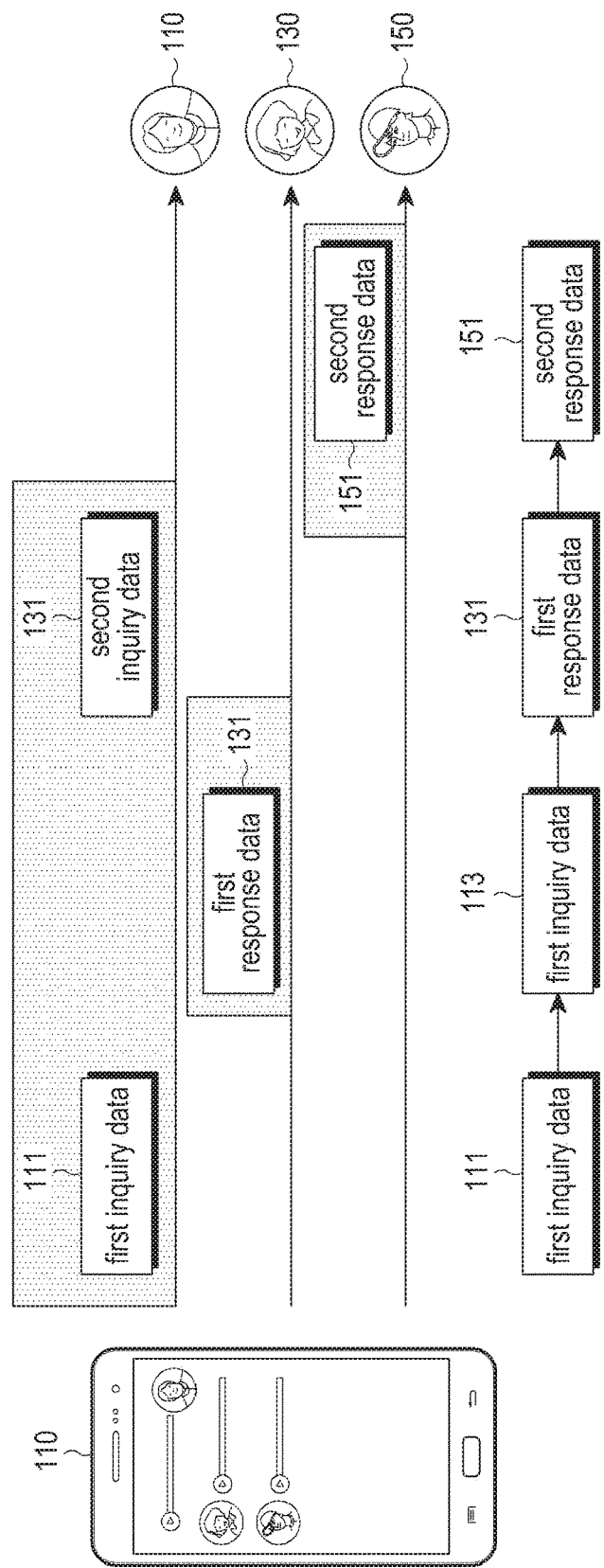
FIG. 1 is a view illustrating an example of providing a PTT service from a conventional UE.

The following detailed description taken in conjunction with the accompanying drawings is provided for a comprehensive understanding of various embodiments of the present disclosure which are defined by the appended claims or equivalents thereof. However, various particular matters set forth below in the detailed description should be regarded simply as examples. Hence, it should be appreciated by one of ordinary skill in the art that various changes or modifications may be made to the embodiments without departing from the spirit or scope of the present disclosure. Known functions and components related to the present disclosure may be excluded from the description for clarity and brevity.

The terms and words used herein should not be interpreted as limited to their literal meanings, and it should be noted that they are rather provided merely for a clear and consistent understanding of the present disclosure. Thus, it is apparent to one of ordinary skill in the art that the detailed description of various embodiments of the present disclosure is intended for description purposes alone, but not for limiting the subject matter of the present disclosure defined by the appended claims and equivalents thereof.

As used herein, the singular forms "a," "an," and "the" are intended to include the plural forms as well, unless the context clearly indicates otherwise. Accordingly, as an example, a "component surface" includes one or more component surfaces.

The terms coming with ordinal numbers such as 'first' and 'second' may be used to denote various components, but the components are not limited by the terms. The terms are used only to distinguish one component from another. For example, a first component may be denoted a second component, and vice versa without departing from the scope of the present disclosure. The term "and/or" may denote a combination(s) of a plurality of related items as listed or any of the items.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. Such terms as those generally defined in the dictionary should be appreciated to be consistent with contextual meanings of relevant technology.

According to an embodiment of the present disclosure, a UE stores data, previously played in real-time, in a predetermined file format to replay the same data as the data played in real-time targeting multiple users or a group through a PTT service. The UE, upon intending to replay the data previously received in real-time, plays data based on information for playing data, which is contained in the stored file format.

To that end, the file format for storing data as per according to an embodiment of the present disclosure is described below with reference to FIG. 2, and a method for replaying data based on the stored file format on the UE is described in detail with reference to FIGS. 3 to 6.

Figure 2:
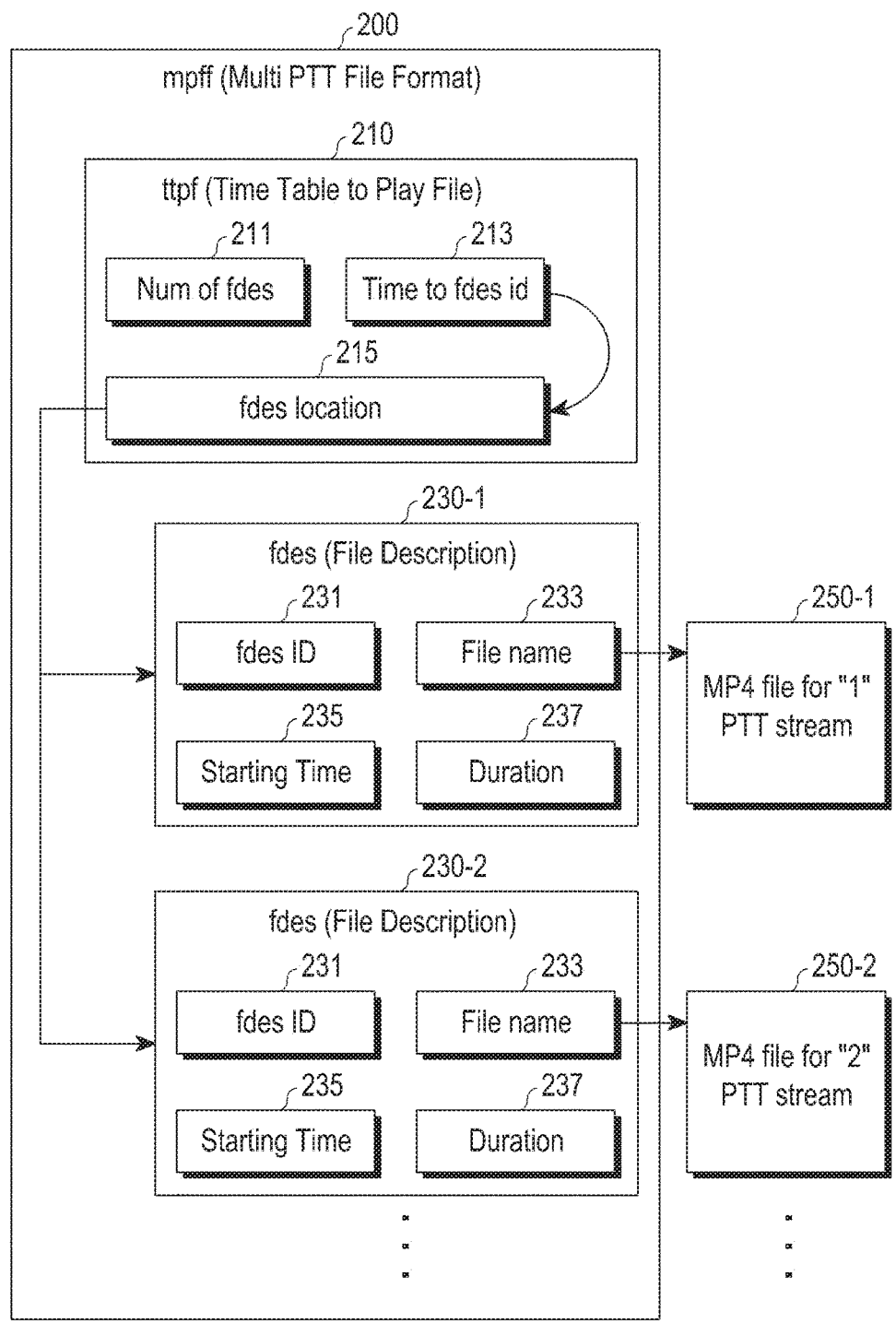
FIG. 2 is a view illustrating a file format in which data is stored in a UE according to an embodiment of the present disclosure.

FIG. 2 illustrates a file format in which data is stored in a UE according to an embodiment of the present disclosure. Here, the file format storing data in the UE according to an embodiment of the present disclosure is defined as a multi PTT file format (mpff) 200. The mpff 200 may be present in an independent file format or present in a metadata area of a private area in a file (e.g., 250-1 or 205-2) for playing corresponding data. As an example, FIG. 2 illustrates a case where the mpff 200 exists in an independent file format. Even where it is present in the metadata area of the private area in the file (e.g., 250-1 or 250-2) for playing corresponding data, the mpff 220 shown in FIG. 2 exists, as it is, in the metadata area.

Referring to FIG. 2, the mpff 200 contains information related to data transmitted from multiple UEs and the time when the data should be played. Specifically, the mpff 200 includes a time table to play file (ttpf) area 210 for playing data and at least one file description (fdes) areas 230-1, 230-2. Hereinafter, the terms "data" and "file" are interchangeably used for ease of description, but they should be construed in the same meaning.

The ttpf area 210 includes a Num of fdes field 211 containing information related to the number of data supposed to be played at the same time, a time to fdes id field 213 containing information related to the play time as per the data identifier id, and a fdes location field 215 containing information related to the location where actual data is present. Here, the ttpf area 210 may be configured of at least one table including the Num of fdes field 211, the time to fdes id field 213, and the fdes location field 215.

The mpff 200 includes as many file description areas as the number of fdes's as per the information related to the number of fdes's contained in the Num of fdes field 211. As an example, where the information related to the number of fdes's contained M the Num of fdes field 211 is information related to two fdes's, the mpff 200 may include two fdes areas 230-1 and 230-2. Hereinafter, an embodiment of the present disclosure is described, for ease of description, under the assumption that the information related to the number of fdes's contained in the Num of fdes field 211 is information related to two fdes's and that the mpff 200 includes two files areas 230-1 and 230-2. Also, where the information related to the number of fdes's contained in the Num of fdes field 211 includes information related to three or more files's, embodiments of the present disclosure may apply likewise, of course.

The fdes areas 230-1 and 230-2, each, includes a fdes id field 231 containing information related to the id of fdes, a file name field 233 containing information related to file name, a starting time 235 containing information related to the time that data starts to be played, and a duration field 237 containing information related to the duration during which data is played.

Here, the information related to the time that data starts to be played, which is contained in the starting time field 235, contains an offset value for a relative time from the time that the PTT service starts. Thus, the UE may be aware of the current play time that the PTT service is provided and may obtain the start time for playing corresponding data from the starting time field 235. Thus, the time to play in the corresponding data may precisely be determined by comparing the current play time with the file start time. A description thereof is given below with reference to FIGS. 4 and 5.

The file format (i.e., mpff) 200 storing data, according to an embodiment of the present disclosure, has been described above with respect to FIG. 2. A method for replaying data based on a stored mpff 200 on a UE is now described with reference to FIG. 3.

Figure 3:
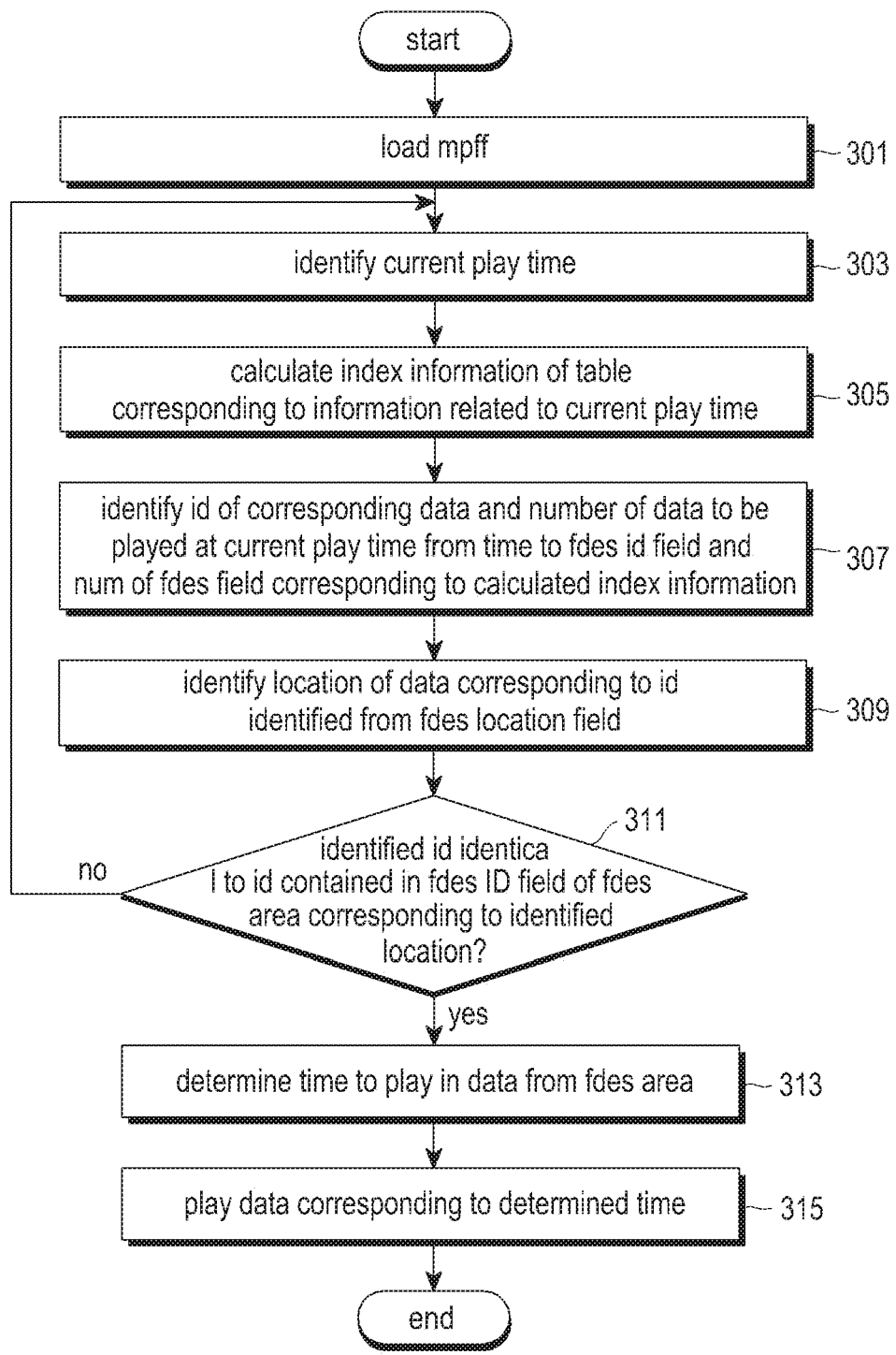
FIG. 3 is a view illustrating a method of providing a PTT service from a UE according to an embodiment of the present disclosure.

FIG. 3 illustrates a method of providing a PTT service from a UE according to an embodiment of the present disclosure. Here, PTT service means a service for replaying data which has previously been played in real-time.

Referring to FIG. 3, the UE loads an mpff 200 containing information regarding at least one data that should be played in the PTT service and the time that the at least one data should be played. The UE identifies the current play time that data is being played through the PTT service (303). At this time, where the UE initiates the PTT service, the current play time has a value of 0. The UE calculates index information of a ttpf 210 which corresponds to information related to the identified current play time (305). Here, the index information means time information. The UE may correspond to the time information contained in the time to fdes field 213 within the ttpf area 210.

As an example, one sample interval for audio data and video data is, in many cases, 10 ms to 20 ms for audio data and 33.3 ms for video data. The index information having a value of 0 is information related to the start time of data first played. In other words, the start time of data to first be played in the PTT service is 0, and the start times for other data are determined using 0 as a reference value.

Therefore, the UE identifies the number of data to be played in the current time and the id of at least one data to be played from the time of fdes id field 213 and the num of fdes field 211 which correspond to the calculated index information in the ttpf 210 area. The UE identifies the location of the area containing the information about the data corresponding to the identified id from the fdes location field 215. At this time, where the number of data to be played in the current is two or more, steps 309 to 315 should be performed per id identified. The fdes location field 215 includes the information indicating the location as information related to a relative byte offset.

Where the identified location is the fdes area 2304, the UE identifies whether the fdes id contained in the fdes ID field 231 is the same as the identified id from the fdes ID field 231 contained in the fdes area 230-1.

Where the identified id is the same as the fdes id contained in the fdes ID field 231, the UE identifies the name of data contained in the fdes area 230-1 and the path where the stream 250-1 of the data is included and then compares the start time of data contained in the fdes area 230-1 with the current play time, determining the time to start play in the data (313). Here, the information related to the play duration contained in the duration field 237 included in the fdes area 231 does not directly affect the playing of data, but it may be used to identify whether data being played is played during wrong duration by comparing the information contained in the time to fdes id field 213 with the information contained in the duration field 237.

In contrast, unless the identified id is the same as the fdes id contained in the fdes ID field 231, the UE returns to step 203, analyzing the ttpf area 210.

The UE identifies the data stream 250-1 from the path and the file name identified and plays the data stream corresponding to the determined time in the data stream 250-1 in the current play time (315). At this time, where the controller includes a decoder, a mixer, and a render, if the mixer receives a plurality of data streams at the same tune, the UE may mix and play the plurality of data. As an example, the UE may provide a PTT service based on the stored mpff as in the embodiment of FIG. 4.

Figure 4:
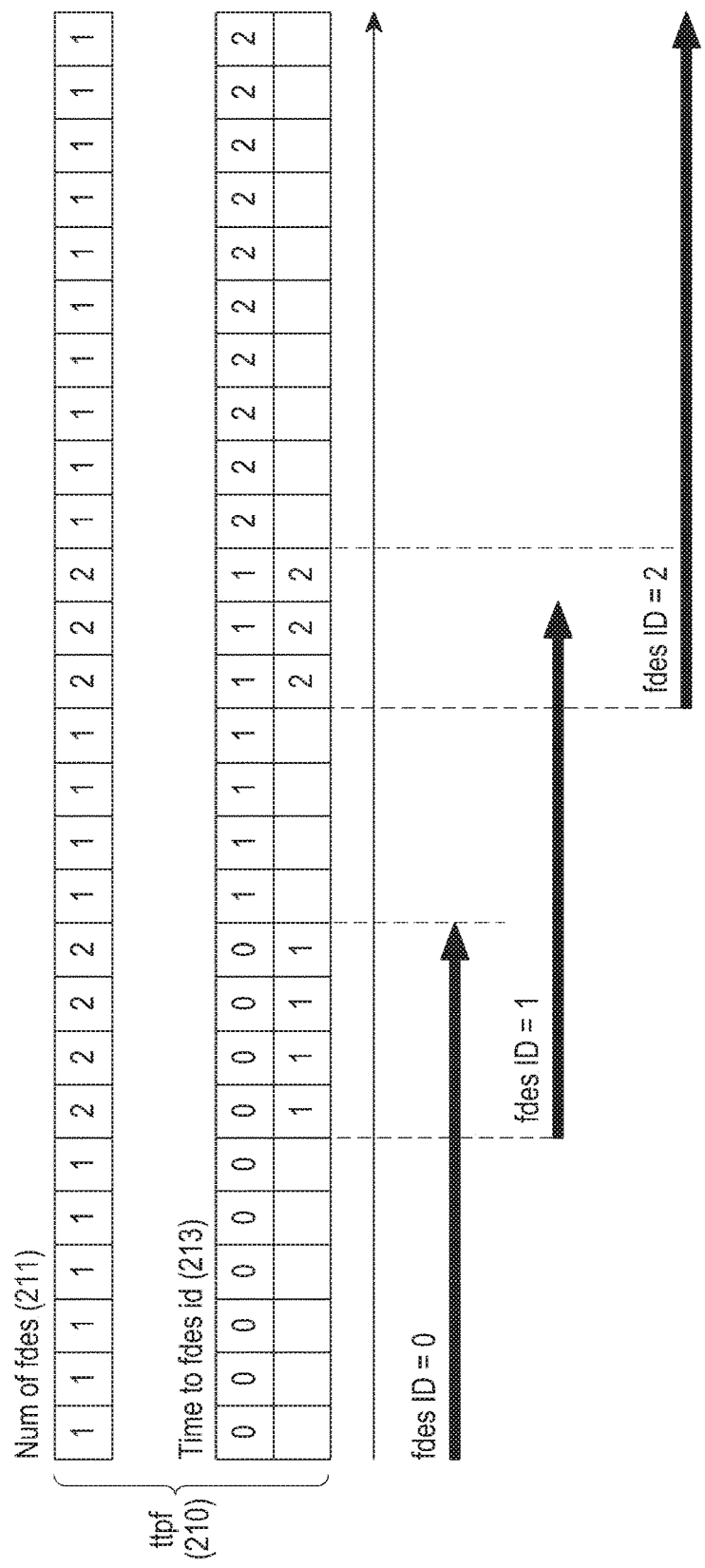
FIG. 4 is a view illustrating an example of providing a PTT service based on a stored mpff from a UE according to an embodiment of the present disclosure.

FIG. 4 illustrates an example of providing a PTT service based on a stored mpff from a UE according to an embodiment of the present disclosure. FIG. 4 illustrates an example of the configuration of the Num of fdes field 211 and the Time to fdes id field 213 included in the ttpf area 210.

Referring to FIG. 4, where the value of the Num of fdes field 211 is 1, the Time to fdes if field 213 contains information related to a time for one ID, and where the value of Num of fdes field 211 is 2, the Time to fdes id field 213 contains information related to a time for two IDs.

Hereinafter, the embodiment of FIG. 4 is described under the assumption that data corresponds to audio data and that the sample interval is 10 ms.

As an example, upon identifying that the value of Num of fdes field 211 is 1 and the value of Time to fdes id field 213 is 0 ms for the information related to the time for id 0, after identifying that the current play time for initiating the PTT service is 0, the UE may play data corresponding to id 0 from the 0 ms time.

Upon identifying that the value of Num of fdes field 211 is 2 and that the value of Time to fdes id field 213 contains information related to the time for id 0 and information related to the time for id 1 (in particular, upon identifying that the information related to the time for id 1 is 60 ms) after identifying that the current play time is 50 ms while providing the PTT service, the UE may play data corresponding to id 1 from the 60 ms time. At this time, since the Num of fdes field 211 is 2, and the value of Time to fdes id field 213 contains both the information related to the time for id 0 and the information related to the time for id 1, the data corresponding to id 0 and the data corresponding to id 1 are mixed and played from the 60 ms time.

Thereafter, upon identifying that the value of Num of fdes field 211 is 1 and that the value of Time to fdes id field 213 contains only information related to the time for id 1, after identifying that the current play time is 100 ms while providing the PTT service, the UE may play only data for id 1 while pausing the playing of data for id 0 at the 100 ms time.

Upon identifying that the value of Num of fdes field 211 is 2 and that the value of Time to fdes id field 213 contains information related to the time for id 1 and information related to the time for id 2 (in particular, upon identifying that the information related to the time for id 2 is 140 ms) after identifying that the current play time is 140 ms while providing the PTT service, the UE may mix and play the data for id 1 and the data for id 2 from the 140 ms time.

Thereafter, upon identifying that the value of Num of fdes field 211 is 1 and that the value of Time to fdes id field 213 contains only information related to the time for id 2, after identifying that the current play time is 170 ms while providing the PTT service, the UE may play only data for id 2 while pausing the playing of data for id 1 at the 170 ms time.

If the UE receives a request for playing data from the 100 ms time in the PTT service, the UE identifies that the current play time is 100 ms, the value of NUM of fdes field 211 corresponding to 100 ms is 1, and the value of Time to fdes id field 213 contains only the information related to the time for id 1. From this, the UE analyzes the fdes area corresponding to id 1 from the files location field 215 of the ttpf area 210. By analyzing the fdes area corresponding to id 1, the UE obtains information regarding the start time and the name of data corresponding to id 1, compares the current play time of the UE with the start tune of data corresponding to id 1, and determines the time from which to play the data corresponding to id 1. In this case, since the current play time of the UE is 100 ms, and the start time corresponding to id 1 is 60 ms, the UE determines to start playing from the 40 ms time of the data corresponding to id 1. Accordingly, where the current play time of providing the PTT service is 100 ms, the UE may perform play from the data stream corresponding to 40 ms in the data corresponding to id 1 at the current play time.

The operation in which the UE provides a PTT service according to an embodiment of the present disclosure has been described above in connection with FIGS. 2 to 4. Next, an internal structure of a UE providing a PTT service in a communication system according to an embodiment of the present disclosure is described with reference to FIG. 5.

Figure 5:
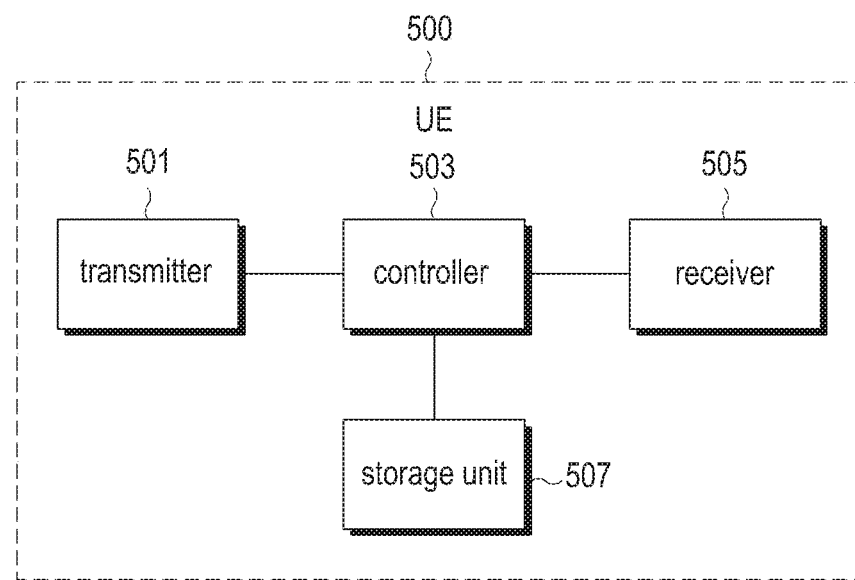
FIG. 5 is a view schematically illustrating an internal configuration of a device for providing a PTT service from a UE according to an embodiment of the present disclosure.

FIG. 5 schematically illustrates an internal configuration of a device for providing a PTT service from a UE according to an embodiment of the present disclosure.

Referring to FIG. 5, a UE 500 includes a transmitter 501, a controller 503, a receiver 505, and a storage unit 507.

The controller 503 controls the overall operation of the UE 500, particularly, operations related to providing a PTT service according to an embodiment of the present disclosure. The operations related to providing a PTT service according to an embodiment of the present disclosure are the same as those described above in connection with FIGS. 2 to 4, and no detailed description thereof is given.

The transmitter 501 transmits various signals and messages to other entities included in the communication system under the control of the controller 503. Here, various signals and messages transmitted by the transmitter 501 are the same as those described above in connection with FIGS. 2 to 4, and no detailed description thereof is repeated.

The receiver 505 receives various signals and messages from other entities included in the communication system under the control of the controller 503. Here, various signals and messages received by the receiver 503 are the same as those described above in connection with FIGS. 2 to 4, and no detailed description thereof is repeated.

The storage unit 507 stores programs and various data related to operations for providing a PTT service according to an embodiment of the present disclosure, which are performed by the UE 500 under the control of the controller 503.

The storage unit 507 stores various signals and messages received by the receiver 505 from other entities.

Meanwhile, although FIG. 5 illustrates a case where, in the UE 500, the transmitter 501, the controller 503, the receiver 505, and the storage unit 507 are implemented in separate units, the UE 500 may also be implemented so that at least two of the transmitter 501, the controller 503, the receiver 505, and the storage unit 507 are integrated together. Further, the UE 500 may be implemented in a single processor.

The internal structure of the UE 500 providing a PTT service in the communication according to an embodiment of the present disclosure has been described above in connection with FIG. 5. Next, an example of a result of implementing an embodiment of the present disclosure in a UE is described with reference to FIG. 6.

Figure 6:
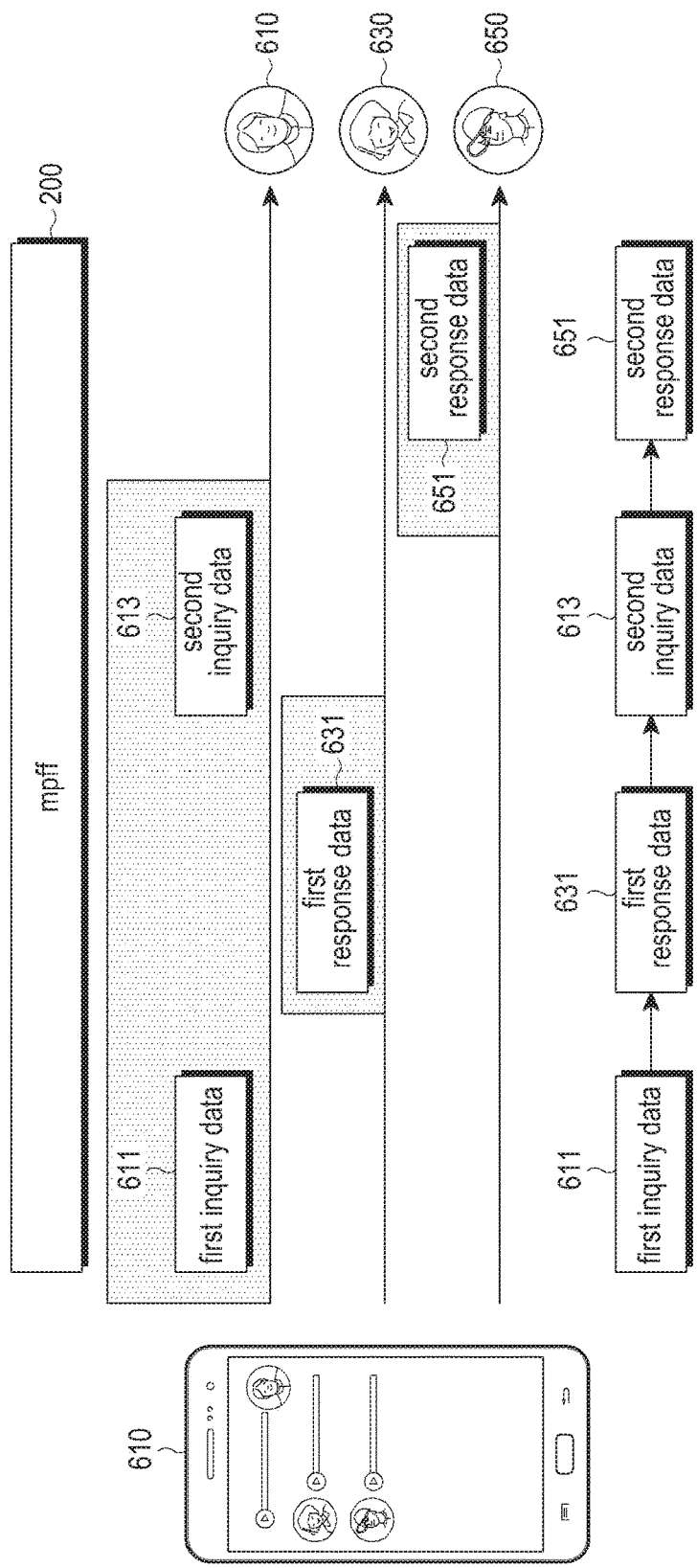
FIG. 6 is a view illustrating an example of a result of providing a PTT service from a UE according to an embodiment of the present disclosure.

FIG. 6 illustrates an example of a result of providing a PTT service from a UE according to an embodiment of the present disclosure.

It is assumed in the embodiment of FIG. 6 that in the PTT service a first UE 610 enters a push button for first transmitting data to send first inquiry data 611 and that, while the push button keeps on being entered for transmission of second inquiry data 613, a second UE 630 enters a push button for transmitting data responsive to the first inquiry data 611 to send first response data 631. It is also assumed that the first UE 610 resends the second inquiry data 613 while keeping on entering the push button, and that a third UE 630 enters a push button for transmitting data responsive to the second inquiry data 613 to send second response data 651.

At this time, according to an embodiment of the present disclosure, in order to replay data which has been played in real-time, the first UE 610 stores and manages information about the number of data played at the same time and information about the id of data played and the time that data has been played on multiple UEs in an mpff 200.

Accordingly, upon entry of an event to replay data which has previously been played in real-time through the PTT service, the first UE 610 may mix and play a plurality of data played at the same time as per the current play time based on the mpff 200.

In other words, since the first UE 110, according to an embodiment of the present disclosure, stores data transmitted from a plurality of UEs 110 to 150, in a single file format (i.e., the mpff 200), data may be played in the order of the first inquiry data 111 transmitted from the first UE 110 as per the current play time in the PTT service, the first response data 131 transmitted from the second UE 130, the second inquiry data 113 transmitted from the first UE 110, and the second response data 151 transmitted from the third UE 150. From this, the first UE 11 may replay the same data as data previously played in real-time.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method for providing a push to talk (PTT) service in a communication system, the method comprising:
    generating a file format including information related to a plurality of data to be played at a same time;
    identifying a current time when a PTT service is provided;
    obtaining the plurality of data to be played at the same time with respect to the current time based on the file format;
    determining time information when the plurality of data starts to play; and
    playing the plurality of data corresponding to the determined time information,
    wherein the information is represented as a time table indexed by a unit time, and
    wherein the time table comprises:
        a first field indicating a number of the plurality of data to be played at the same time with respect to an index,
        a second field indicating identifiers of the plurality of data to be played at the same time with respect to the index, and
        a third field indicating location information of the plurality of data to be played at the same time with respect to an index.

2. The method of claim 1, wherein the file format further includes:
    description information of the plurality of data.

3. The method of claim 2, wherein the description information includes:
    a fourth field indicating an identifier for a first data among the plurality of data,
    a fifth field indicating a name of the first data,
    a sixth field indicating a start time of the first data, and
    a seventh field indicating a time duration of the first data.

4. The method of claim 3, wherein the start time of the first data includes
    a relative offset value of a time when the first data starts to play from a time when a PTT service starts.

5. The method of claim 3, wherein the file format is included in a form of metadata in a header of the first data.

6. The method of claim 1, wherein the plurality of data are related to at least one of an audio, a video, or text.

7. A device for providing a push to talk (PTT) service in a communication system, the device comprising:
    a controller configured to:
        generate a file format including information related to a plurality of data to be played at a same time,
        identify a current time when a PTT service is provided,
        obtain the plurality of data to be played at the same time with respect to the current time based on the file format,
        determine time information when the plurality of data starts to play, and
        play the plurality of data corresponding to the determined time information,
    wherein the information is represented as a time table indexed by a unit time, and
    wherein the time table comprises:
        a first field indicating a number of the plurality of data to be played at the same time with respect to an index,
        a second field indicating identifiers of the plurality of data to be played at the same time with respect to the index, and
        a third field indicating location information of the plurality of data to be played at the same time with respect to an index.

8. The device of claim 7, wherein the file format further includes:
    description information of the plurality of data.

9. The device of claim 8, wherein the description information includes:
    a fourth field indicating an identifier for a first data among the plurality of data,
    a fifth field indicating a name of the first data,
    a sixth field indicating a start time of the first data, and
    a seventh field indicating a time duration of the first data.

10. The device of claim 9, wherein the start time of the first data includes:
    a relative offset value of a time when the first data starts to play from a time when a PTT service starts.

11. The device of claim 9, wherein the file format is included in a form of metadata in a header of the first data.

* * * * *